March 29, 1960  B. B. CRAVENS  2,930,415
INDEXING AND ADJUSTING MEANS FOR A RADIAL SAW
Filed Feb. 25, 1957  3 Sheets-Sheet 1
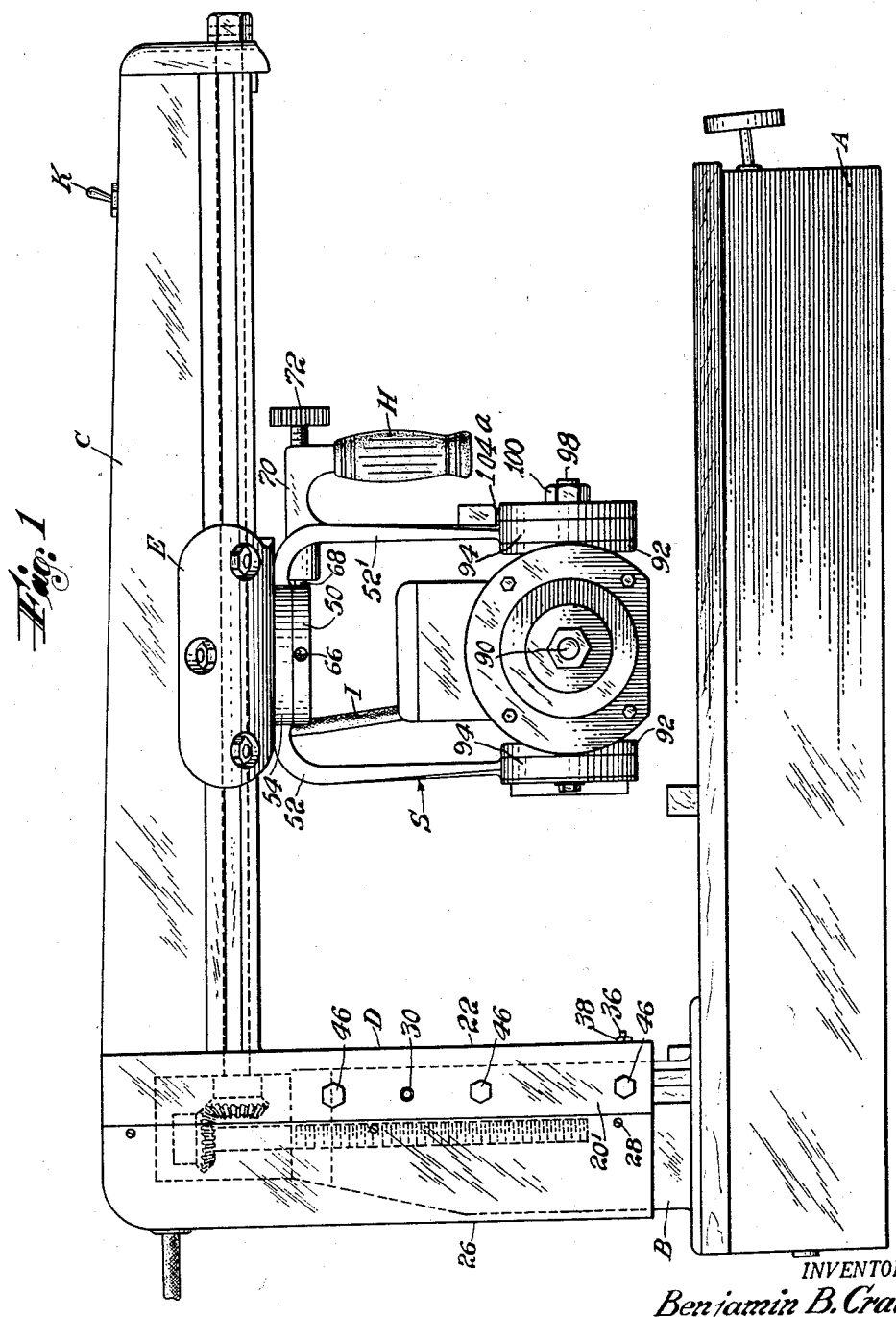
INVENTOR.
Benjamin B. Cravens
BY
ATTORNEY

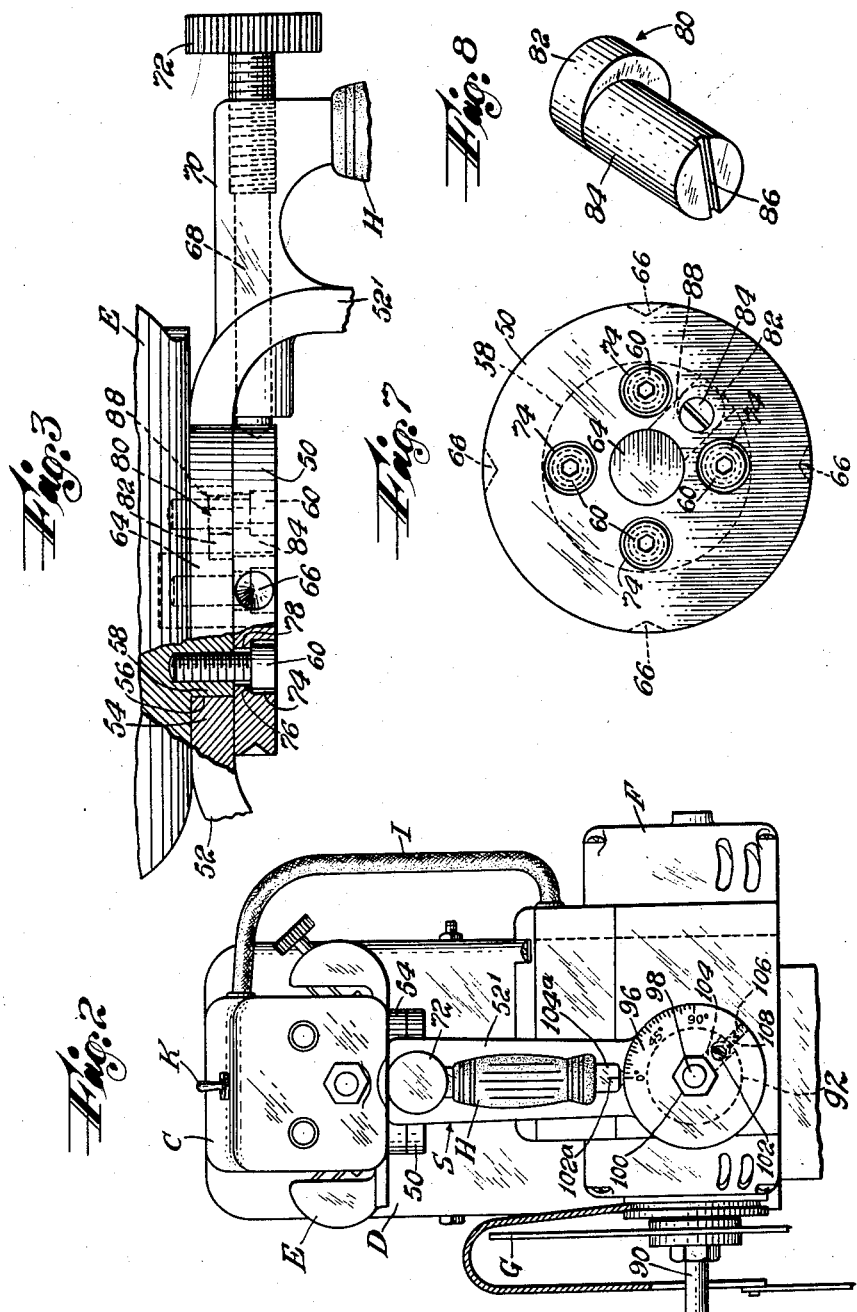

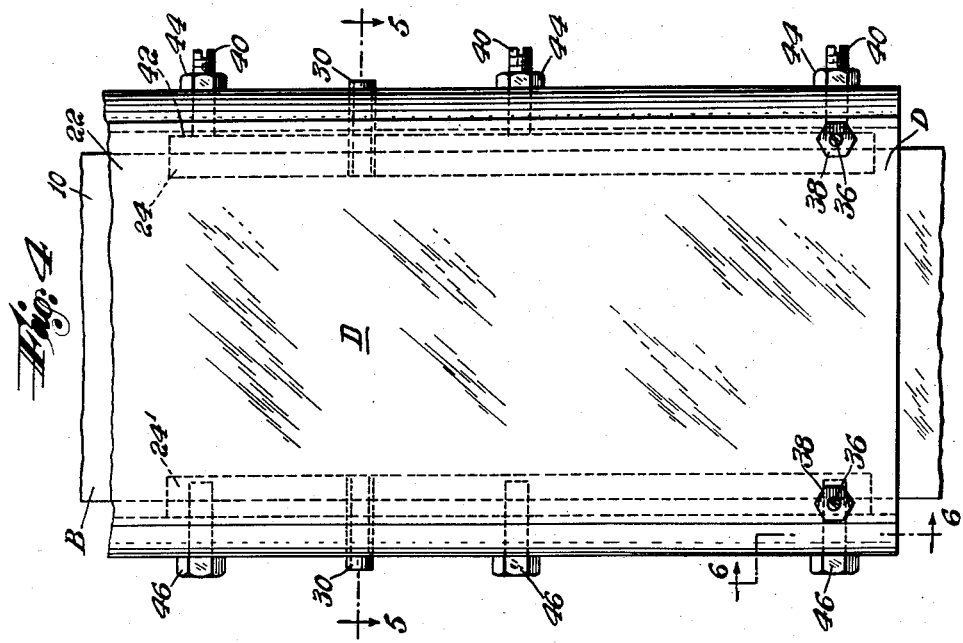
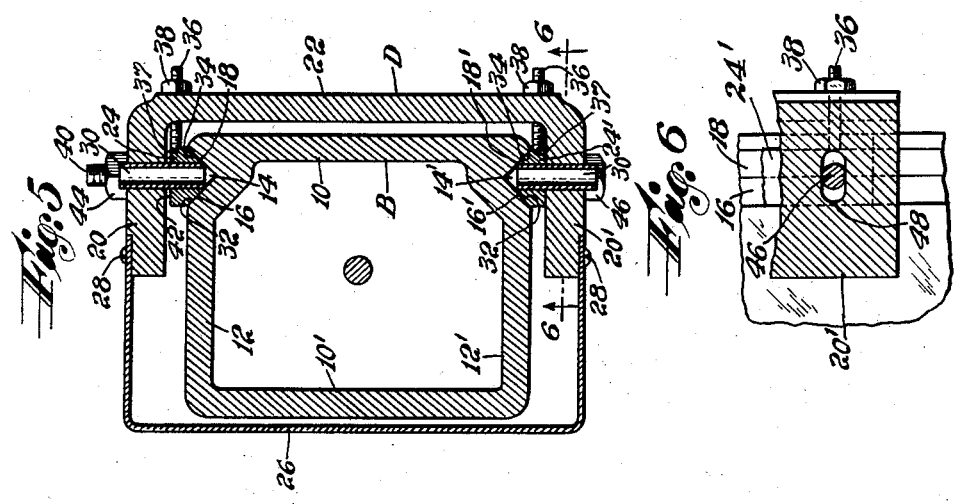

United States Patent Office 2,930,415
Patented Mar. 29, 1960

2,930,415

INDEXING AND ADJUSTING MEANS FOR A RADIAL SAW

Benjamin B. Cravens, Livingston, N.J.

Application February 25, 1957, Serial No. 642,199

1 Claim. (Cl. 143—6)

The invention relates to improvements upon machine tools of the type described in my pending application, Serial Number 501,659, filed April 15, 1955, issued January 27, 1959 as Patent No. 2,870,801. Machine tools of this character include a radial arm upon which a carriage having suspended therefrom a cutting tool is mounted for reciprocation along the arm. The radial arm is mounted for indexing about a vertical axis, and for movement vertically, toward and away from the work bed of the machine. A hanger type of tool support is suspended from the carriage for indexing about a vertical axis, and the tool also is mounted within the support for indexing about a horizontal axis.

For suitable operation of the machine, the radial arm should extend in a plane which is exactly parallel to the horizontal plane of the machine's work bed and the cutting tool must be maintained in exactly correct angular relationship to the work being performed. If the radial arm is misaligned, or out of such parallelism, the depth of the cut through a work piece will not be uniform throughout the length of the cut. Misalignment of this character may result from improper handling of the machine, such as when the machine is accidentally or otherwise subjected to excessive impact loads. An object of the present invention is to provide means for easily and quickly adjusting the position of the radial arm so that it shall extend across the work bed of the machine in a plane parallel to the horizontal surface of the work bed.

In reciprocating the carriage, and tool support connected thereto, along the radial arm, it is essential that the cutting tool, as for example, a motor-driven circular saw, rotate in a plane which is parallel to the length of the radial arm. If the tool's plane of rotation is tilted out of such alignment the line of cutting, instead of being cleanly through the work piece, is at an angle, thereby causing the tool to labor and chip the workpiece. In accordance with another object of the invention, means is provided for adjusting the relationship between the tool support, and with it the tool, with respect to an index plate secured to the carriage so that upon indexing of the tool support about a vertical axis, the tool mounted within the support may be "trued" for rotation in the desired and proper plane of rotation.

Still a further object of the invention is to also provide means for adjusting or correcting the relationship between the tool within its support and an index plate so that upon indexing the tool about a horizontal axis, the plane of rotation of the tool will be proper and true.

Other objects, advantages and results of the invention will be brought out by the following description, taken in conjunction with the accompanying drawings, in which:

Fig. 1 is a side elevational view of a machine tool embodying my invention;

Fig. 2 is a partial front elevational view of the machine;

Fig. 3 is a partial side elevational view, partly in section, showing the manner in which the tool support is connected to the carriage to permit indexing of the support about a vertical axis, including means for making a fine adjustment in the relationship of the axis of the arbor or tool support with respect to an index plate;

Fig. 4 is a partial front elevational view showing the manner in which the channel, connecting the radial arm to the column, is mounted on the column to permit adjustment of the radial arm into a plane parallel with the horizontal plane of the machine's work bed;

Fig. 5 is a cross-sectional view taken approximately in the plane of line 5—5 of Fig. 4;

Fig. 6 is a cross-sectional view taken approximately in the plane of line 6—6 of Fig. 5;

Fig. 7 (Sheet 2) is a bottom plan view of Fig. 3, showing the relationship of the carriage, tool support, coacting index plate, and means for adjusting the relationship of the tool support with respect to the index plate; and Fig. 8 is a perspective view of a preferred means for adjusting the relationship of the tool support with respect to the index plate, or the relationship of the tool within the support and an index plate.

As shown in Figs. 1 and 2, the machine tool generally comprises a work-bed providing base frame A at the rear of which, and centrally, a vertically disposed column B is mounted for indexing about a vertical axis. A radial arm C which extends horizontally over the base frame is connected to the column by downwardly extending channel D. The channel, and with it the radial arm, are connected to the column for rotation therewith, and for vertical movement with respect to the column. Means for indexing the column about a vertical axis; mechanism for locking the column in desired indexed position; and means for raising and lowering the radial arm form no part of the present invention, and are described in detail in the aforementioned pending application.

A carriage E is mounted on the radial arm C for reciprocation along the length of the arm. A hanger type of tool support S is connected to the carriage in a manner to permit indexing of the support about a vertical axis. The support is formed for mounting thereon of a motor F and a directly connected cutting tool G, such as a circular saw. The tool support is provided with a handle H to enable reciprocation of the tool support along the radial arm. The handle is formed with means for fixing the relationship of the carriage and the tool support after the tool support has been indexed about a vertical axis to desired position. Also, the motor and saw are mounted within the tool support for indexing together about a horizontal axis. The motor is connected to a suitable source of power by a cable I in the line of which a relay (not shown) is located, the relay being actuated by a switch K through a relay control cable (not shown), but as particularized in the aforementioned pending application.

The connection between the channel supporting the radial arm and the column which allows rotation of the arm directly with the column, and vertical sliding movement of the arm with respect to the column is shown in Figs. 1 and 4 to 6. The column is hollow and substantially square in cross-section and has front and back walls 10, 10' and side walls 12, 12'. Each side wall is provided with a vertically extending way 14, 14' of substantially V-shape having its surfaces 16 and 18 (or 16' and 18') at an angle of approximately 90° with respect to each other. The channel D, which is substantially C-shaped in cross-section and of greater width than the column, has side walls 20, 20' which extend parallel to and are spaced width-wise from the sides of the column. Also, the front wall 22 of the channel is spaced depth-wise from the column's front wall. The channel side walls, which are of comparatively heavy gauge steel, need only extend in partial overlapping relationship with the side walls of the column to provide a support for gibs 24, 24', one disposed in each of the vertically extending ways 14, 14'. The free ends of the channel side walls may have a comparatively thin gauge channel 26 secured thereto, as by rivets 28, to provide a complete closure for all sides of the column. The channel side walls are each provided with apertures in which substantially cylindrical, hollow, longitudinally slotted spring pivot pins 30 are frictionally received. These resilient pivot pins are of a length to extend beyond the inner surfaces of each channel side wall and are frictionally received in apertures formed in the gibs to resiliently support the gibs. The gibs are provided with surfaces 32, 34 chamfered at an angle for slideable engagement with the surfaces 16, 18, respectively, of each of the ways.

To enable adjustment when necessary of the radial arm into parallelism with the horizontal surface of the machine's work bed, means is provided to permit adjustment of the angular relationship between the column and the channel, or the alignment of the gib with respect to the channel, without disturbing the ability of the channel to move smoothly in a vertical direction with respect to the column. This is accomplished by providing means extending through the channel in engagement with a gib to pivot one end of the gib laterally or in a horizontal direction, toward or away from the front surface of the channel, and locking the gib in such changed position.

As shown in Figs. 4 to 6, adjusting screws 36 extend through the front wall 22 of the channel to bear against a side 37 of each gib 24 and 24'. Upon tightening the screws, corresponding ends of each gib are forced towards the sides 16, 16' of the ways. Lock nuts 38 are provided to hold the adjusting screws in desired position. Extending through the side wall 20 of the channel, and to apply pressure in a direction at a right angle to the direction of pressure applied by a screw 36, a series of vertically spaced adjusting screws 40 are provided to engage the rear side 42 of the gib 24 so as to tighten the gib in the machined ways of the column. Lock nuts 44 are provided to lock the adjusting screws 40 in desired position. By adjusting the positions of the screws 36 the angular position of the gibs 24 may be adjusted so that the relative degree of parallelism of the channel to the plane of the apexes of the surfaces 16 and 18 accomplishes adjustment of parallelism of the plane of the ways on the overhanging arm with the plane of the work table. The gib 24' is connected to the channel by a series of vertically spaced locking bolts 46, each extending through a horizontally elongated aperture 48 in the channel side wall 20', and are received in tapped holes formed in the gib. The minor axis of the elongated opening has a smaller dimension than the head of the locking bolt. The elongated slots permit relative movement of the channel with respect to the bolts and the gib. By this arrangement, the channel may be tilted a slight amount in either direction, and locked in such adjusted position to maintain the radial arm in parallelism with the work bed. The gibs are maintained in the ways to permit smooth sliding of the channel with respect to the column.

In order to adjust, when necessary, the relationship of the tool support S with respect to the carriage, and thereby "true" the axis of rotation of the circular saw G, the tool support is mounted on or hung from the carriage in a manner so that the relationship of the carriage and a circular index plate 50 secured to the carriage may be adjusted. As shown in Figs. 1 and 3, the tool support comprises a pair of laterally spaced, downwardly extending arms 52, 52', the upper ends of which are received within or provide a swivel plate 54. The swivel plate has a central aperture 56 through which extends a circular trunnion or boss 58 formed on the carriage. The index plate is fastened to the boss by a plurality of circumferentially spaced threaded bolts 60 to frictionally support the swivel plate and the tool support while allowing rotation thereof. The index plate is centered with respect to the boss by a centering pin 64 on the plate received within a mating central opening formed in the boss. The index plate is provided with notches or indentations 66 on its peripheral edge, the notches being exactly 90° apart around the circumference of the plate. The notches are adapted to receive the end of a threaded, two-piece locking pin 68, which passes through a horizontally extending portion 70 on the handle H. The locking pin has a knurled head 72 to facilitate turning. When the end of the locking pin is withdrawn from a notch, the tool support may be rotated around a vertical axis provided by the downwardly extending boss 58. By changing the fixed relationship between the index plate and the carriage, the position of the notches in the edge of the index plate is changed for cooperation with the means carried by the support, the locking pin 68. Thus, the relationship between the support and the index plate is adjusted.

As shown in Figs. 3 and 7, the index plate is formed on its lower side with recesses 74 to receive the heads of the bolts 60. The heads of the bolts are each bottomed on a shoulder 76 when the threaded portions of the bolts are fully received within tapped holes formed in the boss 58. On the upper side of the index plate, and above the shoulders 76, the plate is counterbored to provide openings 78, each having a diameter providing sufficient clearance to allow limited rotation of the index plate with respect to the carriage, but of a diameter smaller than the diameter of a bolt head. Thus, when the bolts 60 are loosened, the index plate may be loosely suspended from the boss, and is capable of being turned with respect to the boss about the centering pin 62. In order to rotate or adjust the position of the index plate, and thereby shift the position of the notches 66, cam or eccentric means 80 is provided to coact between the index plate and the carriage.

As shown in Fig. 8, the cam means comprises a pin having an enlarged eccentric portion 82 at one end of a shaft 84, a kerf 86 being provided at the other end. As shown in Figs. 3 and 7, the shaft 84 extends through a closely fitting aperture formed through the index plate, and the eccentric portion is received within a radially extending slot 88 provided in the boss. The slot is of a width to afford engagement with the slot's side walls by the eccentric portion to the fullest extent of its eccentricity or major diameter. With the holding bolts loosened, a screw driver may be inserted in the kerf 86 to cause engagement of the eccentric portion 82 with either side wall of the slot 88, and thereby rotate the index plate in either direction with respect to the carriage. The adjusted position is maintained by simply tightening the holding bolts 60.

As shown in Figs. 1 and 2, a similar arrangement may be used to adjust the relationship between the motor driven tool G and the support S within which the tool is mounted for indexing about a horizontal axis. The tool, such as a circular saw, is directly connected to the shaft 90 of the motor F. The motor has fastened to the sides thereof oppositely extending trunnions 92 journaled in bearings provided by end plates 94 fastened to the lower ends of the support arms 52, 52'. A dial plate 96 is provided on a center shaft 98, which provides the horizontal axis of rotation for the motor and tool with respect to the support. A lock nut 100 on the end of the shaft 98 secures the assembly together. The dial plate has imprinted thereon a scale of degrees matching with a datum line 102 and a plunger 104 secured in an arm of the support. The dial plate does not rotate, except when the entire assembly including the motor, tool, and trunnions are rotated about the shaft 98, and this is accomplished when the lock nut 100 is loosened.

To adjust the position of the dial plate with respect to the trunnion with which it is in engagement, and thereby adjust the axis of rotation of the tool in the support, a second eccentric-headed pin 102, as previously described, is located between the trunnion and the dial plate. The trunnion is provided with a radially extending slot 104, which receives the eccentric portion of the pin, and the shaft portion extends through the dial plate for turning by a screw driver received in the kerf at the end of the shaft. To fix the position of the eccentric head within the slot, a radially extending aperture 106 is formed to extend to the edge of the dial plate. The aperture intersects the slot in the trunnion, and is screw threaded near its inner end, at least, to receive a set screw 108 which can be reached with a long screw driver. The set screw engages the eccentric head to hold it in desired position. The lock nut is then tightened to secure the assembly in the desired adjusted relationship.

It is believed that the advantages of the improvements of my radial saw will be apparent from the foregoing detailed description. The plane of cutting of the tool may be adjusted, and maintained in corrected position at each of the points where the machine may possibly be put out of alignment. The described corrective means is of particular advantage in a portable machine tool for the "do it yourself" trade, where simplicity and ease of operation are of particular importance. It will also be apparent that while the invention has been described and explained in its preferred form, changes may be made in the structure disclosed without departing from the scope of the invention, as sought to be defined in the following claim.

I claim:

In a machine tool of the type including a radial arm upon which a carriage having a motor driven cutting tool suspended therefrom is mounted for reciprocation along the arm, the tool being mounted on a support connected to said carriage for indexing of the support about a vertical axis, an index plate cooperating with said support and secured to said carriage, and means carried by said support to releasably fix the support to the index plate; an improvement for adjusting the plane of rotation of the cutting edge of the cutting tool and for adjusting the axis of the arbor upon which the tool is mounted by adjusting the relationship between the support and the index plate comprising a radial slot formed in said carriage, a pin extending through the index plate and having an eccentric head disposed in said slot, said index plate being formed to allow limited rotation thereof with respect to the carriage though connected to said carriage, whereby rotation of the pin will turn the index plate with respect to the carriage and change the position of engagement between the index plate and the means carried by the support to releasably fix the support to the index plate, a plurality of threaded bolts extending through the index plate and received in the carriage for connecting the index plate to the carriage, said index plate being formed to provide a shoulder for engagement by the head of each bolt, said shoulders being located intermediate the lower and upper sides of the plate, a recess on the lower side to receive the head of the bolt, and a counter-bored opening extending from the upper side of the plate, said counter-bored opening having a diameter providing sufficient clearance for the limited rotation imparted to the index plate with respect to the carriage by the eccentric headed pin, said diameter being greater than the diameter of the head of a bolt, whereby the bolts may be loosened to allow the position of the index plate to be adjusted, and upon tightening, secure the index plate to the carriage in desired adjusted position.

References Cited in the file of this patent

UNITED STATES PATENTS

| | | |
|---|---|---|
| 333,631 | Holz et al. | Jan. 5, 1886 |
| 1,636,924 | Porter | July 26, 1927 |
| 1,733,518 | Snover | Oct. 29, 1929 |
| 2,104,299 | Grundstein | Jan. 4, 1938 |
| 2,291,999 | Wilson et al. | Aug. 4, 1942 |
| 2,513,497 | Laughlin | July 4, 1950 |
| 2,719,761 | Bonnafe | Oct. 4, 1955 |
| 2,738,625 | Strnad | Mar. 20, 1956 |

FOREIGN PATENTS

| | | |
|---|---|---|
| 667,977 | Great Britain | Mar. 12, 1952 |